United States Patent [19]

Swanson

[11] Patent Number: 4,848,275
[45] Date of Patent: Jul. 18, 1989

[54] FISH FARMING SYSTEM AND METHOD

[76] Inventor: Erick Swanson, Troutbeck Hatchery, Cobble Rd., Kent, Conn. 06757

[21] Appl. No.: 56,668

[22] Filed: Jun. 2, 1987

Related U.S. Application Data

[63] Continuation-in-part of Ser. No. 814,999, Dec. 31, 1985, Pat. No. 4,669,420.

[51] Int. Cl.[4] ............................................. A01K 61/00
[52] U.S. Cl. ....................................................... 119/3
[58] Field of Search .................................... 119/2, 3, 4

[56] References Cited

U.S. PATENT DOCUMENTS

| | | | |
|---|---|---|---|
| 2,944,513 | 7/1960 | Keely | 119/3 |
| 3,716,025 | 2/1973 | Lawson | 119/3 |
| 4,212,268 | 7/1980 | Chapman | 119/3 |
| 4,221,187 | 9/1980 | Casey | 119/3 |
| 4,249,480 | 2/1981 | Dugan et al. | 119/2 |
| 4,471,718 | 9/1984 | Olson | 119/3 |
| 4,669,420 | 6/1987 | Swanson | 119/3 |

Primary Examiner—Gene Mancene
Assistant Examiner—R. Thomas Price
Attorney, Agent, or Firm—Rogers & Killeen

[57] ABSTRACT

A method and apparatus for providing aerated water to a tank used for the rearing of aquatic animals. Positioning of the intake posts and exit drains to establish one or more volutes of water which substantially fill the tank provides a self-cleaning tank with reduced areas of inhabitability. The method and apparatus permits tanks to be lengthened without a need to add turbulence to the water. An improved method and apparatus for efficiently maintaining cleanliness and oxygen levels of the water is disclosed as well as a system for energy efficiently maintaining the temperature of the water in the tank.

6 Claims, 4 Drawing Sheets

FISH FARMING SYSTEM AND METHOD

BACKGROUND OF THE INVENTION

The present invention generally relates to systems for rearing aquatic life and, in particular, to a method and apparatus for providing aerated water and nutrients to living organisms such as fish within a tank and for removing waste from the tank.

A substantial number of systems have been developed to enable fish farming or fish husbandry operations to be successfully conducted in a commercial setting. In some systems, a cage is immersed in a body of water, such as an ocean or lake, and fish are deposited within the cage until they have grown to the desired size. While immersed cages provide a nearly natural setting to the fish raised within and accordingly entail relatively few expenses for pumping and filtering water, the cages are subject to the vagaries of nature, such as storms or predators which may damage the cage and allow the fish to escape and water temperature changes which may adversely affect the feeding habits of the fish, and in the extreme, may cause death.

In other systems, fish farming is conducted on land in a large tank or tanks which have been filled with fresh or salt water. Fish eggs or fishlings are introduced to the tanks of water and are provided with nutrients to enable the growth of the fish to a commercially usable size. Tank systems are generally less susceptible than cage systems to storms and predators. Additionally, the water in the tank can be heated or cooled to maintain the water at or near a desired temperature.

For a tank type fish farming operation to be commercially economical, it is often necessary that a relatively high density of fish be placed in the water. Such a high density of fish rapidly consume the oxygen and nutrients available in the water and pollute the water with their metabolite waste products. If additional nutrients and oxygen are not provided to the water or if the waste products are not neutralized or removed, the water will no longer support the life of the fish being raised therein.

To provide the required oxygen and to remove the waste products, it is generally known to introduce freshly aerated water into the tank holding the fish and to remove the water which has been polluted by the waste products. It is common that such aerated water be pumped into the tank to provide a circulation of the aerated water throughout the tank.

To reduce the amount of water required in the operation of a fish farm, it is known to filter the waste-filled water, to aerate the filtered water, and to re-introduce the aerated, filtered water back into the tank. Such a closed system in which most of the waste water is re-used reduces considerably the amount of water consumed in the fish farming operation.

A number of methods are known to aerate the water provided to a tank. For example, it is known to allow the water to set in a tank exposed to fresh air to permit the partial pressure of oxygen in the atmosphere to come to equalization within the partial pressure of oxygen in the water. To speed the aeration process it is known to allow the water to fall through the air, and/or over a trickling surface, to increase the mixing of oxygen with the water. It is also known to supply the water to the open top of a vertical tube within a concentric cylinder having its bottom end sealed. As the water is supplied to the tube, a supply of air is passed through the water and becomes entrained therein. As the water with the entrained air is forced to the bottom of the tube by the pressure of the water entering the tube, the water becomes supersaturated with the oxygen in the air.

While the U-tube efficiently oxygenates the water, the partial pressure of nitrogen in the air is also simultaneously applied to the water, resulting in a supersaturated solution of nitrogen in the water. Such a nitrogen rich solution cannot be withstood by the fish and, accordingly, measures must be taken to reduce the nitrogen concentration in the water.

Conventional pumps are used to move the water through the filtration system and aeration system and to provide momentum to the water being introduced to the tank, which enables circulation of the aerated water throughout the tank. The cost of continually operating such pumps often represents a considerable percentage of the cost of a fish farming operation. Consequently, methods and apparatus of fish farming which reduce the amount of water which must be pumped and/or the velocity at which the water is introduced into the tank are often very beneficial to a fish farming operation.

At least two types of tanks and associated aeration systems have generally been utilized in fish farming operations: rectangular tanks and cylindrical tanks. In many rectangular tanks, aerated water is provided to the fish in the tank by placing a series of intake nozzles along one end of the tank and a set of drains along the opposite end of the tank. The water exiting the intake nozzles is directed parallel to the longitudinal axis of the rectangular tank, i.e., in parallel lines aimed directly toward the drains.

The waste products of the fish include solid particles or offal components. In order to self-clean the tanks of the solids, i.e., to use the water to carry the solids to the drainage end of the tank, it is often necessary to introduce the intake water at a high volume and velocity. Conventionally, rectangular systems require 100 gallons per minutes of aerated water per foot of width of the tank for each three feet in depth of the tank. For example, in a rectangular tank having a width of 32 feet and a 6-foot depth, it is often necessary to provide up to 6,000 gallons of water per minute. If water is introduced at a lesser rate, the tank will generally not self-clean, i.e., carry off solid waste particles, and will not provide an efficient environment for fish rearing.

The performance of rectangular tanks in fish farming operations is often hindered by the need to exhaust water from the intake nozzle at a high volume and velocity so that the water has a sufficient momentum to travel the length of the tank to the drain and clean the tank. Because the introduction of water with such high velocity into the tank agitates the water already in the tank in the area surrounding the introduction point, the end of the tank at which the water enters is often not occupied by fish which prefer less turbulent water. As the length of the tank increases and consequently the need for higher velocity of the incoming water is increased, more of the intake end of the tank may be unused by the fish.

As the water passes through the tanks, the oxygen available in the water is used by the fish, the water picks up metabolites, including ammonia, thrown off by the fish. Accordingly, when the water reaches the vicinity of the drains, it may be so depleted of available oxygen and/or so polluted by the metabolites that fish will not habitate in the drain end of the tank. Typically, in such rectangular tanks, one-third to one-fourth of the drainage end of the tank is unusable because of the lack of oxygen and the high concentration of waste products in the water. Consequently, even if a rectangular tank is lengthened, the water area available for rearing of fish is not necessarily increased unless other measures are taken to increase the water flow rate.

As the water is drained from rectangular tanks, it may be filtered, aerated and pumped back to the intake nozzle of the tank for reintroduction into the tank or it may be supplied to a second, similar tank cascaded next to the first tank for introduction into the second tank. If the tanks are cascaded, the waste water from the final tank in the cascade may be discarded or filtered again and returned to the first tank in the cascade. Between the tanks of the cascade, aeration may be accomplished by allowing the water to fall to a lower level at which the next tank in the cascade is positioned.

Cylindrical tanks are also well-known for use in fish husbandry. Such tanks are often aerated by providing a series of intake ports along a radius of the tank, with all of the ports exhausting water in a direction perpendicular to the radius to establish a circular flow around the tank. Drains may be placed at the bottom of the tank near the center or approximately vertically below the radial intake ports. In this configuration of tank, water may be pumped through the intake ports, traverse the circular course of the tank and exit through the drains.

As noted above, in connection with rectangular tanks, for efficiency it may be desirable to filter the waste products from the water in the tank, aerate the water, and reintroduce the aerated, filtered water to the tank. Also, in a similar fashion to rectangular tanks, it is known to cascade a series of cylindrical tanks, so that the drained water from one tank may be aerated through a waterfall and applied to the intake ports of the next tank in the cascade to lower the requirement for pumping water.

An alternative aeration structure used in conventional cylindrical tanks provides a set of intake ports across an entire diameter of the tank with the nozzles of the intake ports pointed perpendicular to the diameter in the direction to promote a circular flow of the fluid within the tank.

An alternative to the longitudinally aerated rectangular tank and the radially aerated cylindrical tank is disclosed in the Ruckl U.S. Pat. No. 833,418, issued Oct. 16, 1906, in which intake water is introduced along an end of a rectangular tank which has fillets in each corner to help to circularize the flow of water within the tank.

While the operating cost of circular tanks used in fish rearing is generally 25% less than similarly capable rectangular tanks, cylindrical tanks are generally less efficient than rectangular tanks in the use of space occupied by the tanks. For example, if a fish farmer desires to add additional tanks to increase his production, rectangular tanks may be placed end-to-end and side-to-side, utilizing nearly all the available floor (or ground) space in a farming site. In contrast, cylindrical tanks when placed side-to-side abut only at a single point and, consequently, a considerable amount of floor space is not used in fish farms having a number of cylindrical fish tanks.

As an alternative to increasing the number of tanks to provide additional farming capability, a farmer could increase the size of the tanks. However, increases beyond certain sizes are not practical due to the high velocity of water which must be introduced into the tank in order to provide self-cleaning. Such high velocity water may result in turbulence in the tanks and result in unused space and in space which cannot be used to house different sizes of fish.

It is, accordingly, an object of the present invention to provide a novel method and apparatus for providing aerated water to a fish tank.

It is a further object of the present invention to provide a novel method and apparatus for increasing the effective and usable size of tanks for the rearing of aquatic animals.

It is yet a further object of the present invention to provide a novel method and apparatus for economically providing aerated and clean water in which to rear aquatic animals.

It is still a further object of the present invention to provide a novel method and apparatus to provide a fish tank with freshly aerated water with a reduced consumption of water.

It is yet another object of the present invention to provide a novel method and apparatus for the energy efficient circulation of water in a fish tank.

It is still another object of the present invention to provide a water management system for an energy efficient fish rearing tank.

These and other objects and advantages will be readily apparent to one skilled in the art for which the invention pertains from reading the following detailed description when read in conjunction with the appended drawings.

THE DETAILED DESCRIPTION

Figure 1:
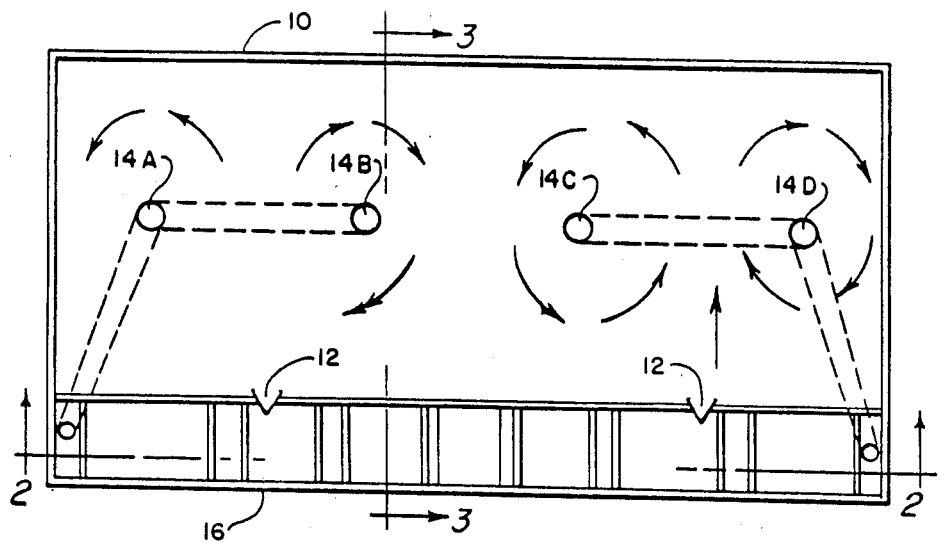
FIG. 1 is a pictorial representation of one embodiment of a tank and aeration/filtration system of the present invention illustrating the top thereof.
Figure 2:
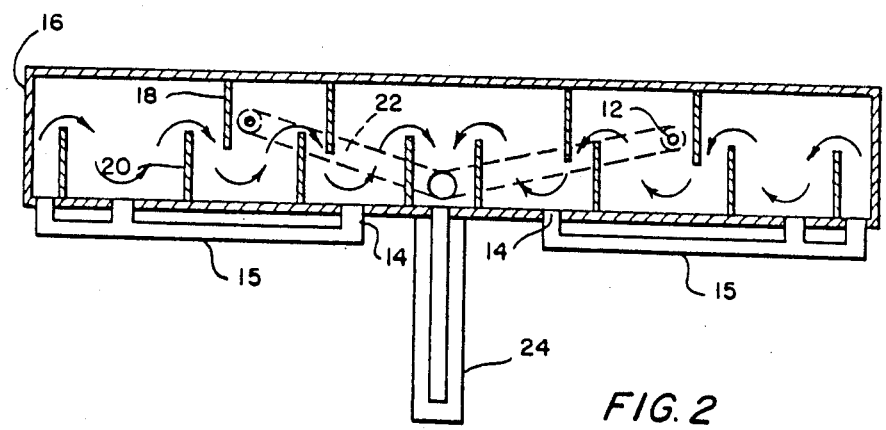
FIG. 2 is a pictorial representation of a side of the tank and aeration/filtration system of FIG. 1.
Figure 3:
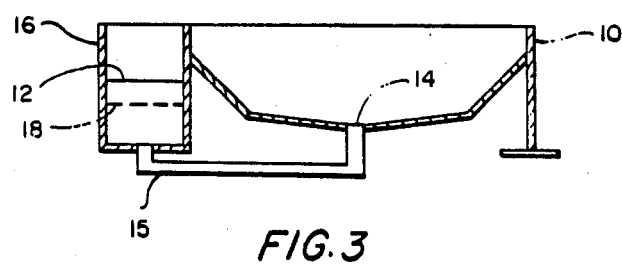
FIG. 3 is a pictorial representation of the end of the tank and aeration/filtration system of FIG. 1.

With reference to the drawings, and with particular reference to FIGS. 1-3, the apparatus of the present invention is pictorially illustrated in association with a rectangular tank 10. As shown in FIGS. 1-3, the tank 10 may have two intake ports 12 for introducing water into the tank 10. The intake ports 12 may each include a nozzle for increasing the velocity of the fluid being introduced to the tank 10 therethrough. Generally, the intake ports 12 may be situated near the top of the fluid contained within the tank, either above or below the fluid's surface.

With continued reference to FIGS. 1–3, the apparatus may include 4 drains 14A–14D positioned at or near the bottom of the tank to drain water therefrom. A series of conduits 15 connect the drains 14 to a filtration tank 16. The filtration tank 16 includes a plurality of upper dividers 18 and lower dividers 20 each of which extends laterally across the width of the filtration tank 16. The upper dividers 18 and lower dividers 20 are located at the upper and lower extremes of the filtration tank 16 and are vertically dimensioned to intercept the water flowing longitudinally within the filtration tank 16.

Water exiting the filtration tank 16 may be pumped via pump lines 22 to the intake ports 12 for reintroduction to the tank 10. Prior to being pumped back to the tank 10, the water may be aerated to increase its available dissolved oxygen content. The aeration may be accomplished by any conventional means. Alternatively, an apparatus for performing the aeration may include a U-tube and packed column combination as described in more detail below.

With continued reference to FIGS. 1–3, in operation, the tank 10 is filled with a fluid in which aquatic animals can thrive. The composition of the fluid depends upon the metabolism of the animals being reared. For example, rainbow trout may be economically produced in a tank filled with water at a temperature of approximately 65° F. The temperature of the water can fall as low as 45° F. and growth will continue in rainbow trout; however, the growth will be considerably lessened. For example, rainbow trout may grow in 1½ to 1¾ inches per month in 65° water and will grow only ¼ inch per month in 45° water.

For some animals, the use of brackish water in the tank 10 is preferred. For trout, a salinity of 11 parts per 1,000 often produces acceptable results. The use of brackish water as contrasted to fresh water generally increases the bacteria activity, prevents foul smell and taste for animals living in the water and helps the salinity regulation of the fish being reared therein.

The tank 10 is supplied with a source of aerated water through the intake ports 12 which may be at or below the level of the top of the water in the tank 10. Placement of the intake ports 12 above the surface of the water provides additional splashing and thereby oxygenation of the water while correspondingly increasing the amount of turbulence in the water near the intake ports 12.

The drains 14 may be placed at approximately the longitudinally centerline on the tank 10 and are positioned along the centerline so that the combination of the momentum of the water being received from the intake ports 12 and the low pressure provided to the water by the drains 14 causes the water in the tank 10 to swirl in volutes from the intake ports 12 t the drains 14.

The spiraling movement of the water throughout the tank can carry feed or nutrients throughout the tank and enables the tank to be self-cleaning, i.e., the waste products of the fish in the tank are carried by the spiraling water to the drains 14.

To assist in the establishment and the maintenance of a spiral flow, fillets (not shown) may be placed in the corners of the tank 10 and flow deflectors may be placed along the side of the tank 10 opposite the side carrying the intake ports 12.

A spiraling flow throughout the tank provides aerated water and removes waste products throughout the entirety of the tank. The intersection of the adjacent volutes of water form a type of waterwall so that the rectangular tank operates more as a series of round tanks without the loss of floor space attendant to the use of round tanks and without the requirement for constructing the walls between adjacent tanks.

The establishment of volutes enables the length of the tank to be extended as desired without the need to increase the velocity of the water entering the tank and its attendant loss of usable space due to turbulent water as in conventional rectangular tanks. In tanks and aeration systems of the present invention, the length of the tank can be increased by adding another intake port and appropriate number of drains to establish additional volutes in the additional area of the tank.

While additional water may be needed to establish the volutes in the additional area of the tank, generally less water is needed to establish such volutes than would be needed in conventional rectangular tanks to establish a sufficient flow of water in the additional tank area.

The system of the present invention generally requires less pumping of water than conventional fish farming systems. The benefit of lowered pumping is magnified by the fact that less water has to be filtered and, in those locations where fresh water must be heated to maintain optimum tank temperature, less water need be heated.

When the water in the tank 10 reaches the drains 14, it is usually laden with polluting solids and liquid products from the fish in the tank 10. The water is directed through the drain and conduit 15 to the filtration tanks 16. The filtration tank 16 both filters the waste through the filters contained in the upper dividers 18 and/or the lower dividers 20 and serves as a settling tank for the particulate matter. As the velocity of the flow of the water in the filtration tank 16 is reduced, solid particles entrained in the flowing water will tend to settle out. The settling is enhanced by the course established for the water by the upper and lower dividers 18, 20.

With reference to FIG. 2, when the water reaches the filtration tank 16, it is forced over the top of the lower dividers 20 and beneath the bottom of the upper dividers 18 as the water courses from the ends of the filtration tank 16 to middle. As the water flows over the lower dividers 20 and below the upper dividers 18, particulate waste material will tend to settle out of the water and to fall into the troughs formed in the filtration tanks 16 by the lower dividers 20.

Figure 4A:
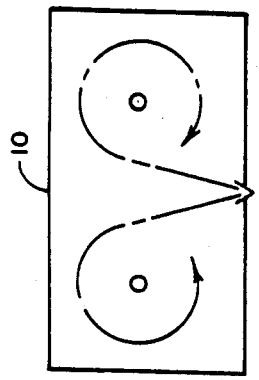
FIGS. 4(a)–4(g) are pictorial views of alternative embodiments of a tank of the present invention illustrating the positioning of the intake and exit nozzles to provide a spiral flow throughout.
Figure 4B:
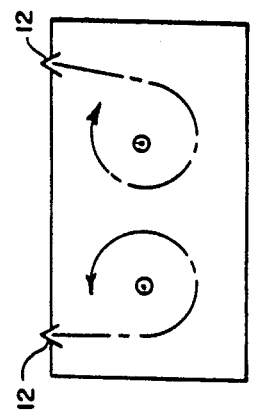
Figure 4C:
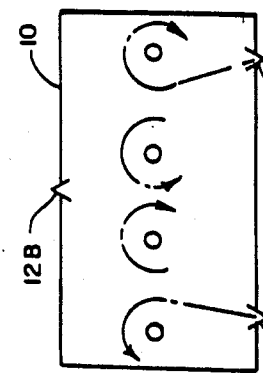

In the tanks 10 depicted in FIG. 4(C), two intake ports 12A, 12B and four drains 14 establish four volutes. At the center of the tank, a third intake port 12C may be positioned on the opposite side of the tank 10 from the two ports 12A, 12B to enhance the volutes created by the other intake ports 12.

Figure 4D:
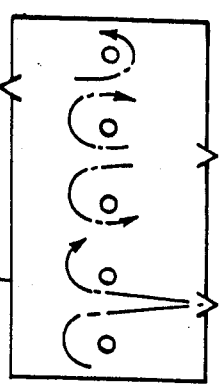

With reference to FIG. 4(D), the intake ports 12 may be placed on either side of the tank so long as the arrangement of intake ports 12 and drains 14 provides a series of volutes which swirl in the same direction at their points of confluence.

Figure 4E:
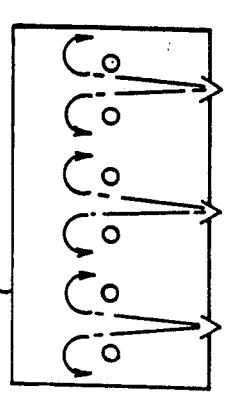

With reference to FIG. 4(E), a tank may be provided with three intake ports 12 and six drains 14 to result in an effective and well aerated tank 10 with a longer side dimension than the tank 10 depicted in FIGS. 1–3. With reference to FIGS. 4(D) and 4(E), the tanks in the referenced figures illustrate the placement of the intake ports 12 on either side of the tank 10, depending upon the number and position of drains 14 and intake ports 12.

Figure 4F:
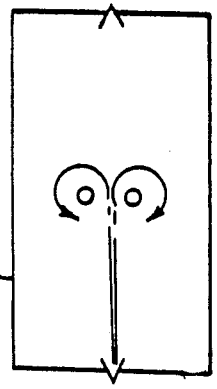
Figure 4G:
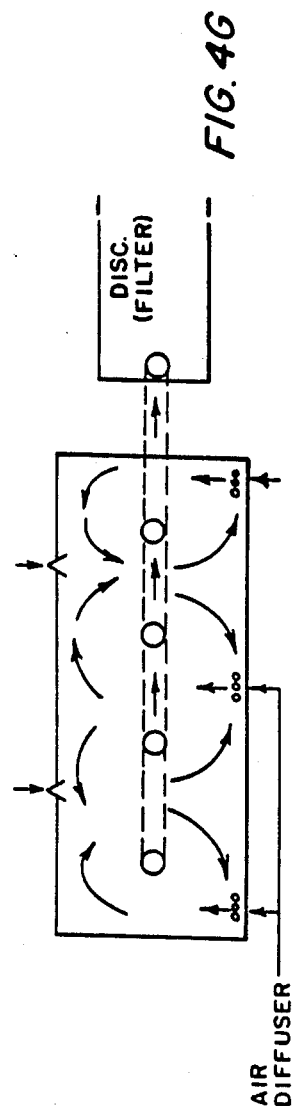

With reference to FIG. 4(F), the scope of the present invention also encompasses tanks in which the intake ports 12 are located along the end walls of the longitudinal tank and direct a spiraling flow longitudinally along the length of the tank 10. Such an arrangement may be used, for example, in those locations where the layout of the pumps and associated structure of the tank 10, make placement at the ends of the tank easier.

While fish are often able to live at an oxygen concentration of 3 parts-per-million in the water, generally the higher the concentration of oxygen in the water, the better the environment for fish rearing. As the percent of saturation of oxygen increases, the susceptibility of the fish to disease decreases. At oxygen saturations of 90% and greater in the water, diseases of the fish are practically eliminated. Thus, it is often important in fish rearing tanks to maintain a high oxygen saturation within the water of the tank.

Figure 5:
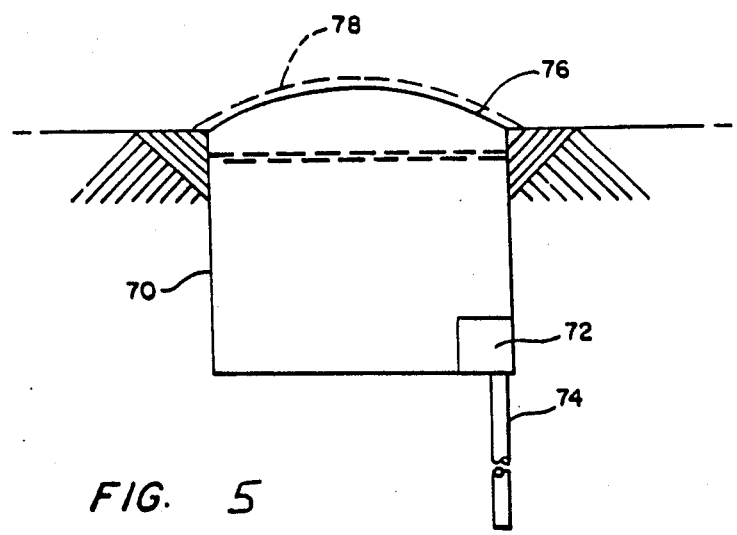
FIG. 5 is a pictorial representation of one embodiment of a water temperature control system in accordance with the present invention.

One of the most important variables in the economic production of fish is the temperature of the water in the fish tank. As noted previously, a rainbow trout which will grow at a rate of ¼ inch per month in 45° F. water will grow at a rate of 1½ to 1¾ inches per month in 62° F. water. At the higher temperature, fish are known to both consume more food and more efficiently convert the food they consume. A method to control the temperature of the water is illustrated in the tank and pumping system of FIG. 5. With reference to FIG. 5, a tank 70 may be sunk into the earth so that the surrounding ground provides a heat insulating layer from the atmosphere. A pump 72 provides a motive source for pumping water into the tank, through a filtration system, and up from an underground source through a well pipe 74.

The tank 70 may be covered by a metal frame 76 onto which a single or double layer of plastic has been attached to entirely enclose the tank 70. When desired, the frame 76 may be covered by a light absorbing material such as a black mesh netting 74. The well pipe is sunk into the ground to a level at which the underground water is a constant temperature throughout the year. If the well pipe is sunk to a depth of approximately 15–30 feet, a supply of water is available at a constant temperature throughout the year.

In particular in a salmonid farming operation a temperature control system regulates the water temperature to approximately 60° F. at the bottom of the tank 70. When it is desirable to add fresh water to the tank, the pump 72 can pump the needed amounts of water from the source of water at the end of well pipe 74. Since the 50° F. water from the underground source is close in temperature to the 60° temperature of the tank, the addition of the fresh water does not substantially change the temperature of the water within the tank 70. In the summer, when the effects of ambient air temperature and the heat of the sun's rays on the tank cause the water in the tank 70 to increase above a desired temperature, the pump 72 can supply the fresh underground water at 50° temperature to cool the tank 70 and balance the heat obtained from the sun.

To additionally assist in the temperature control of the water in the tank 70 during the summer months, the black mesh netting 78 may be spread across the metal frame to block direct heating by the sun. Variable control of the sun's heating can be accomplished by covering only portions of the metal frame 76 with the black mesh netting 78.

In the winter in the United States, the problem of temperature control in the fish tank is usually one of keeping the temperature of the water sufficiently warm. Accordingly, the pump 72, which generates considerable amount of heat in its operation, may be submerged within the tank so that the tank can receive the heat generated by the pump 72. Additionally, the plastic covered metal frame 76 encloses the entire tank 70 and heats the water in the tank 70 and the air directly above the tank 70 by a greenhouse effect of the sun's rays striking the plastic covering the tank 70. Should the water become too cold during the winter, the pump 72 may operate as it does in the summer to add underground water to the tank for heating purposes. By employing the passive devices such as the plastic cover frame, the insulation of the earth, and the black mesh netting 78, the temperature control system of the present invention can efficiently regulate the temperature of the fish farming operation.

Figure 6:
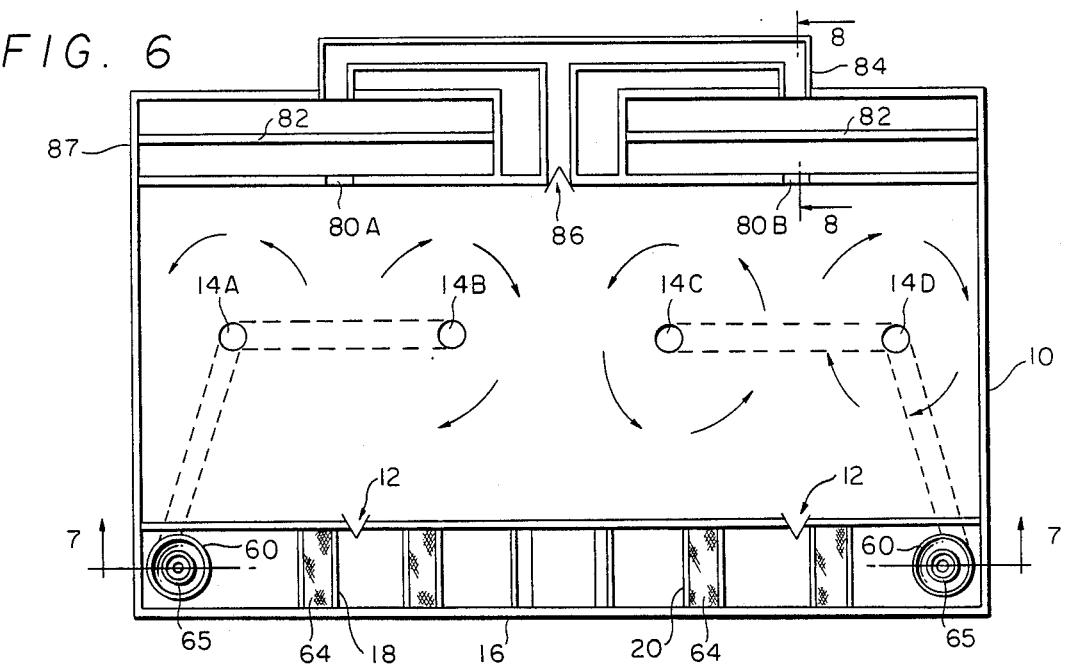
FIG. 6 is a pictorial representation of a second embodiment of a tank and aeration/filtration system of the present invention illustrating the top thereof.

With reference to FIG. 6, another embodiment of the tank and aeration/filtration system of the present invention may include a generally rectangular tank 10 having intake ports 12 and drains 14 positioned respectively at the sides and bottom of the tank to provide a spiraling flow of water through the tank. Water exiting the tank through the drains 14 may be filtered through a spiral separator 60 and further filtered by a filtration tank 16. The filtration tank 16 may include active or inactive filter media 64 for entrapment of particulate contaminants and/or removal of other waste products.

With continued reference to FIG. 6, the tank 10 may also be provided with top drains 80A, 80B positioned approximately at the level of the fluid within the tank along one of the side walls thereof. The top drains 80A, 80B communicate between the tank and an aeration system 87. The aeration system 87 may include a separating baffle 82 to force fluid from the tank to follow a predetermined course through the aeration system 87 and to exit at a return pipe 84. The return pipe 84 communicates with a nozzle 86 through which the aerated water is returned the tank 10.

With continued reference to FIG. 6, water may be provided to the nozzles 12 to establish a spiral flow of water within the tank about the four drains 14A, 14B, 14C, 14D. Some of the water may be allowed to exit the tank through the top drains 80A, 80B. Use of the top drains at or near the level of the fluid in the tank 10 reduces disturbances within the water of the tank. Additionally, by proper placement of the top drains 80A, 80B the spiral flow of the water about the bottom drains 14 may be assisted. In practice, 70 to 80% of the water to be drained from the tank may be drained through the top drains 80A, 80B and the remaining 20 to 30% water to be drained may be drained through drains 14 at the bottom of the tank.

Generally, the water at the top of the tank is far less polluted by waste products and less oxygen depleted than the water near the bottom of the tank. Accordingly, water exiting from the top of the tank 10 generally requires less filtration and aeration in order to cleanse the water for return to the tank. The relatively dirtier water which drains through the bottom drains 14 generally has been entrained more solid and liquid waste products and requires relatively more filtration and aeration before water may be reintroduced to the tank. Former tanks generally provided that all the water be drained through a single system and filtered/aerated in the same manner. In such former tanks, the cost of pumping and filtering the entire volume of water in a single manner is relatively expensive when compared with the costs of minor aerating and filtering of the water leaving the top of the tank while more heavily filtering and aerating the water leaving by the bottom drains 14.

Figure 7:
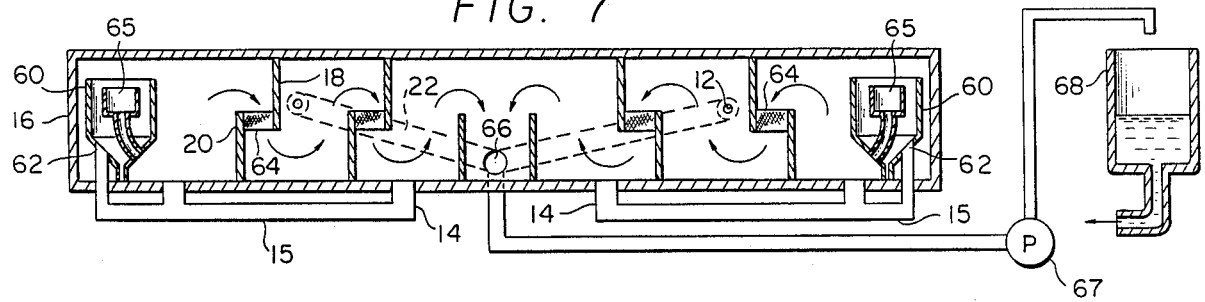
FIG. 7 is a pictorial representation of a side of the tank and aeration/filtration system of FIG. 6.

With reference to FIG. 7, the spiral separator 60 communicates with the bottom drains 14 of the tank through a drain pipe 62. The drain pipe 62 provides water to the swirl separator 60 with motion along the radial direction of the separator. As water swirls and rises within the swirl separator 60, the relatively sludge and other waste particulars are precipitated out of the water and fall to the bottom of the separator 60. The cleaner water cascades into a collection tube 65 from which it may be exhausted into the filtration tank 16 for additional filtering.

As the water goes over the bottom separators of the filtration tank there may be further filtering by active or inactive filters 64 to remove additional particulate matter and/or particulate contaminants. A path provided for the water within the filtration tank 16 further permits settling of solids from the water at the bottom of the tank. Additionally, air may be provided for the purposes of aeration at selected locations at the bottom of the filtration tank 60, particularly below the filters 64. The filtered water exhausts through a drain 66 to a pump 67 where it is pumped to the top of an aeration tower 68. Once the water reaches the bottom of the aeration tower 68, it may be pumped back into the tank 10 as has been previously described in relation to FIG. 2.

Figure 8:
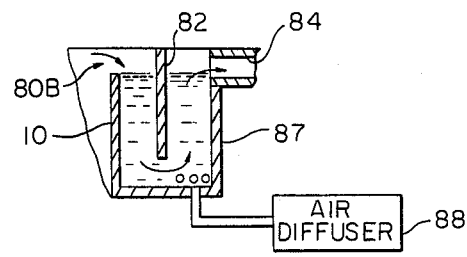
FIG. 8 is a pictorial representation of a portion of the end of the tank and aeration/filtration system of FIG. 6.

With reference to FIG. 8, the aeration system 81 may include a top drain 80B from the tank 10 which permits water to gently flow out of the tank 10 and into the aeration tank 81. Water within the aeration tank 81 may be allowed to follow a course established by a separating baffle so that the water runs vertically downwardly under the baffle 82 and exits through the return pipe 84. The movement of the water is assisted by an air diffuser 88 which provides diffused air to the upbound portion of the water. The air provided by the diffuser 88 creates lift in the water, establishes the water flow, and provides aeration to the water.

The separator baffle 82 may also filter the water. Optionally, additional filters may be placed in the aeration system 81 or the water may be further filtered by conventional means.

Figure 9:
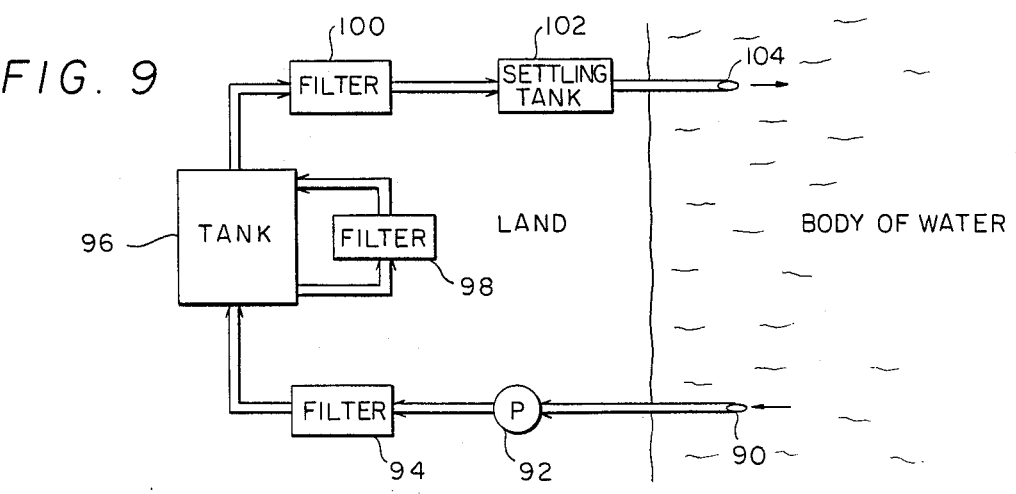
FIG. 9 is a schematic block diagram of a fish farming system utilizing features of the present invention.

With reference to FIG. 9, a fish farming system which utilizes the elements of the present invention will include a tank 96 in which fish stock is grown. Water may be provided to the tank 96 from a body of water, such as a ocean, sea, river, or an underground source through an intake pipe 90 under the control of a pump 92 which provides the water to a filter 94. The filter 94 may be a sand filter to remove solid materials from the water to avoid contamination of the tank and pumping systems. The water within the tank may be filtered as described previously through a filter 94 and recirculated back to the tank. Water which is to be removed from the tank may be exhausted through a filter 100 to remove waste material and additional particulate contaminants may be settled out through a settling tank 102 before the water is returned to the body of water through an exit pipe 104.

In operation, the body of water will provide a fresh and temperature controlled source of water for many months of the year. However, during the winter months, the water provided by the body of water may be of such low temperature as to be dangerous to the life within the tank 96. During such winter months, the amount of water withdrawn from the body of water may be reduced and the fish farming system operated primarily by recirculating water within the system. As the present invention reduces the need for fresh water, use of the present invention enables the fish farming system to be operated in a self contained mode for the winter months. As the system of the present invention does not require a large amount of fresh water, the cold fresh water from the body of water during the winter need not be added to the tank in large amounts and therefore the need to heat the tank is reduced or eliminated.

Although exemplary embodiments of the invention have been described with reference to particular structures, it is to be understood that various modifications can be made thereto without departing from the spirit and scope of the invention. Accordingly, the invention is not limited by the above description but only by the attached claims.

I claim:
1. A system for rearing aquatic life, comprising:
   (a) a generally rectangular tank having four generally vertical walls and a floor;
   (b) a pump for circulating a fluid into the tank, out of the tank and through a filtering device;
   (c) one or more intake ports, each port positioned along one of the side walls of said tank and connected to said fluid to discharge said fluid in a direction generally perpendicular to said one of the side walls;
   (d) one or more drains, each drain positioned along the lateral center of said floor and operatively connected to said filtering device to discharge said fluid from the tank to said filtering device so that the fluid in the tank forms two or more volutes; and,
   (e) one or more top drains, each top drain positioned along one of the walls of said tank to discharge said fluid from the tank to a second filtering device.

2. A system for rearing aquatic animals, comprising:
   (a) a generally rectangular tank having two generally planar sidewalls, two generally planar end walls and a floor; a pump for discharging a fluid;
   (b) at least one fluid intake, each intake spaced along one of the sidewall and positioned to discharge fluid in a direction generally perpendicular to the place of said one of the sidewalls;
   (c) a plurality of fluid drains positioned within said floor each drain adapted to drain fluid from said tank so that when the tank is at least partially filled with a fluid and said fluid is discharged through said fluid intake, a spiral flow of the fluid is established between the fluid intake and a least one of the fluid drains
   (d) a filtering device to receive fluids drained from said fluid drains; and
   (e) a top drain positioned along one of said walls to discharge fluid from said tank into a second filtering device.

3. An improved aeration system for rearing aquatic animals, comprising:
   (a) a generally rectangular tank having two pairs of generally planar vertical walls and a floor, said tank capable of holding a quantity of a fluid;

(b) four fluid drains, each drain positioned along the floor at the center of a longitudinal quadrant of said tank;

(c) two fluid intakes, each intake positioned along one of said walls at the intersection of the extension and interior quadrants to direct fluid flowing through said intake into the tank in a direction perpendicular to said one of the walls;

(d) filtering means for removing impurities from a fluid;

(e) means for transporting fluid drained through said drains to said filtering means;

(f) means for transporting fluid filtered by said filtering means to said fluid intakes; and (g) aerating means for aerating a fluid;

(h) top drain positioned along one of the walls of the tank for removing fluid therefrom into said aerating means; and (i) means for transporting fluid from said aerating means to said tank.

4. A system for rearing aquatic life, comprising:

(a) a tank having walls and a floor for containing a quantity of a fluid having particulate matter and air suspended therein;

(b) one or more bottom drains, each in said floor, for removing fluid from the bottom of said tank;

(c) a first filtering device for removing a first portion of particulate matter per volumetric unit of the fluid removed through said bottom drains and for providing a first volume of air per volumetric unit to the fluid removed through said bottom drains;

(d) one or more top drains, each in the top portion of one of said walls at the level of the fluid in the tank, for removing fluid from the tank; and (e) a second filtering device for removing a second portion of particulate matter per volumetric unit of the fluid and for providing a second volume of air per volumetric unit to the fluid removed through said top drains, said first portion being larger than said second portion, and said first volume being larger than said second volume.

5. A system for rearing aquatic animals, comprising:

(a) a tank having walls and a floor;

(b) at least one fluid intake, each intake spaced along one of the walls and positioned to discharge fluid into the tank;

(c) a plurality of fluid drains in said floor;

(d) a first filtering device to filter fluids drained from said fluid drains;

(e) a plurality of top drains in said walls; and (f) a second filtering device to receive fluids drained from said top drains, said first filtering device providing more filtration than said second filtering device.

6. A system for rearing aquatic animals, comprising:

(a) a tank having walls and a floor, said tank capable of holding a fluid containing impurities;

(b) filtering means for removing impurities from said fluid;

(c) one or more bottom drains positioned along the floor of said tank for removing a first quantity of the fluid therefrom into said filtering means;

(d) means for transporting said first quantity of the fluid filtered by said filtering means to said tank;

(e) aerating means for aerating said fluid;

(g) one or more top drains positioned along the walls of the tank for removing a second quantity of the fluid therefrom into said aerating means; and (h) means for transporting said second quantity of the fluid from said aerating means to said tank, said second quantity being approximately at least two times larger than said first quantity.

* * * * *